(12) United States Patent
Min et al.

(10) Patent No.: US 7,821,680 B2
(45) Date of Patent: Oct. 26, 2010

(54) IMAGE SENSOR HAVING IMPROVED RESOLUTION AND IMAGE SENSING METHOD USING THE SAME

(75) Inventors: Dong Ki Min, Seoul (KR); Seung Bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 950 days.

(21) Appl. No.: 11/655,245

(22) Filed: Jan. 19, 2007

(65) Prior Publication Data
US 2008/0007804 A1    Jan. 10, 2008

(30) Foreign Application Priority Data
Jul. 6, 2006    (KR) ...................... 10-2006-0063480

(51) Int. Cl.
G06F 15/00    (2006.01)
H04N 1/04    (2006.01)
(52) U.S. Cl. .................. 358/474; 358/482; 358/1.2
(58) Field of Classification Search ............... 358/474, 358/475, 1.2, 1.3, 400, 408, 476, 482, 483, 358/486, 494, 497; 250/200, 552, 559.05, 250/559.06, 559.15; 382/254, 312, 318, 382/319
See application file for complete search history.

(56) References Cited
U.S. PATENT DOCUMENTS
6,522,777 B1 * 2/2003 Paulsen et al. .............. 382/154
2004/0178478 A1 * 9/2004 Shizukuishi ................ 257/620
2005/0195281 A1 * 9/2005 Misaka et al. ............ 348/207.99
2005/0225812 A1 * 10/2005 Bledsoe et al. .............. 358/497
2006/0087748 A1 * 4/2006 Choi et al. ................... 359/784
2007/0012954 A1 * 1/2007 Murayama .................. 257/222
2007/0086067 A1 * 4/2007 Suemoto et al. ............. 358/482
2008/0165267 A1 * 7/2008 Cok ....................... 348/333.01

FOREIGN PATENT DOCUMENTS
JP    2001-148798 A    5/2001
JP    2003-23567 A    1/2003

* cited by examiner

Primary Examiner—Jerome Grant, II
(74) Attorney, Agent, or Firm—Sughrue Mion, PLLC

(57) ABSTRACT

Disclosed is an image sensor capable of improving the resolution of images without modifying the resolution of a photoelectric conversion semiconductor device for sensing images and an image sensing method using the same. The image sensor is adapted to sense images through photoelectric conversion and includes a scanner unit adapted to move on a plane; a photoelectric conversion semiconductor device fixedly mounted on the scanner unit and having a number of pixels being arranged on a front surface; and an array of color filters arranged on the photoelectric conversion semiconductor device so as to correspond to the pixels. The image sensor improves the resolution of sensed images by sensing data of images, which cannot be sensed according to the related art, while using a conventional photoelectric conversion semiconductor device without modification, and without incurring further cost or degrading the performance.

8 Claims, 4 Drawing Sheets

IMAGE SENSOR HAVING IMPROVED RESOLUTION AND IMAGE SENSING METHOD USING THE SAME

CROSS-REFERENCE TO RELATED APPLICATION

This application claims priority from Korean Patent Application No. 10-2006-0063480 filed on Jul. 6, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to an image sensor having an improved resolution and an image sensing method using the same. More particularly, apparatuses and methods consistent with the present invention relate to an image sensor capable of improving the resolution of images without modifying the resolution of a photoelectric conversion semiconductor device for sensing images and an image sensing method using the same.

2. Description of the Related Art

As generally known in the art, image sensors convert one-dimensional or at least two-dimensional optical information into electric signals. Image sensors are classified into image sensing tubes and solid-state image sensing devices. The image sensing tubes have been widely used for measurement, control, recognition, etc. based on image processing technology in the television industry and applied techniques have been developed accordingly. The solid-state image sensing devices are made of photoelectric conversion semiconductors to convert optical images into electric signals. The solid-state image sensing devices are classified into Metal Oxide Semiconductor-type MOS devices and Charge Coupled Device-type (CCD) devices.

Complimentary Metal Oxide Semiconductor (CMOS) image sensors convert optical images into electric signals by using CMOS semiconductor technology. Particularly, MOS transistors are fabricated as much as pixels and are used to detect output successively (i.e., switch mode). Compared with conventional CCD image sensors, CMOS image sensors are convenient to drive and enable various scanning modes. In addition, they have the advantage of compactness, because signal processing circuits can be integrated into a single chip.

Recently, various multimedia appliances (e.g., mobile telephones, PDAs) are equipped with devices for sensing or displaying images. For example, compact camera modules are used as image input devices. As consumers increasingly demand high-quality images, many efforts have been made to improve the resolution of image sensors used as image input devices.

FIG. 1 is a perspective view showing a conventional image sensor adapted to sense images through photoelectric conversion.

Referring to FIG. 1, the conventional image sensor includes a photoelectric conversion semiconductor device 10, a color filter array 20, and a micro-lens array 30.

The photoelectric conversion semiconductor device 10 is fixedly mounted on top of a scanner and has a number of pixels arranged on the front surface so as to constitute a light receiving unit. Particularly, each pixel generates a signal charge in proportion to the intensity of light incident on the pixel.

The color filter array 20 is adapted to create color digital images and has an array of filters (e.g., red, green, and blue filters), which correspond to the pixels of the photoelectric conversion semiconductor device 10 on a one-to-one basis. The color filter array 20 is formed on top of the light receiving unit of the photoelectric conversion semiconductor device 10 through a lithography process, for example.

The micro-lens array 30 consists of a number of lenses, e.g. hemispherical micro-lenses 31, which are two-dimensionally arranged on top of the color filter array 20. The lenses are aligned with respective pixels of the photoelectric conversion semiconductor device 10 (as in the case of the filters of the color filter array 20) so as to increase the amount of light incident on the light receiving unit.

In order to improve the resolution of the conventional image sensor, which is constructed as mentioned above, the pixels of the photoelectric conversion semiconductor device 10 must be increased.

FIG. 2 shows a method for increasing the number of pixels of a photoelectric conversion semiconductor device of a conventional image sensor, in order to improve the resolution.

Referring to FIG. 2, the number of pixels 11 of the photoelectric conversion semiconductor device 10 can be increased either by increasing the size of the photoelectric conversion semiconductor device 10 itself or by reducing the size of respective pixels 11.

If the number of pixels is increased while maintaining their size, the chip size of the photoelectric conversion semiconductor device 10 is increased in proportion. This costs more money. Furthermore, the increase in chip size reduces the yield rate, which further increases the cost.

If the number of pixels is increased while maintaining the chip size of the photoelectric conversion semiconductor device 10, the size of the pixels 11 becomes smaller. This makes the manufacturing process difficult. In addition, since the sensitivity of the pixels is degraded, they are more affected by noise and exhibit poorer performance. Therefore, this approach is impractical.

SUMMARY OF THE INVENTION

Apparatuses and methods of the present invention have been made to address the above-mentioned problems occurring in the related art, and an aspect of the present invention is to provide an image sensor capable of improving the resolution of sensed images while using a conventional photoelectric conversion semiconductor device without modification, i.e., without incurring further cost or degrading the performance.

Another aspect of the present invention is to provide an image sensing method using an image sensor having an improved resolution so that the resolution of sensed images is improved accordingly.

Further, there is provided an image sensor for sensing images through photoelectric conversion with an improved resolution, the image sensor including a scanner unit adapted to move on a plane; a photoelectric conversion semiconductor device fixedly mounted on the scanner unit and having a number of pixels being arranged on a front surface; and an array of color filters arranged on the photoelectric conversion semiconductor device so as to correspond to the pixels.

The image sensor may further include an array of micro-lenses formed on top of the array of color filters while corresponding to the pixels so that light is collected.

The scanner unit may be adapted to move in horizontal and vertical directions on the plane. In addition, the scanner may be adapted to travel a distance shorter than a distance between the adjacent pixels.

According to another aspect of the present invention, there is provided a method for sensing images through photoelectric conversion by using an image sensor, the method including the steps of sensing an image using a number of pixels of a photoelectric conversion semiconductor device mounted on a stationary scanner unit; storing data of the image sensed by the photoelectric conversion semiconductor device; moving the scanner unit to a location on a plane; sensing a different image by the pixels of the photoelectric conversion semiconductor device at the location; storing data of the different image; and comparing data of the image with data of the different image and analyzing both data so as to create data of a resulting image having an improved resolution.

The scanner unit may be made to travel a distance shorter than a distance between adjacent pixels. In addition, the scanner unit may be moved in a horizontal or vertical direction on the plane.

According to another aspect of the present invention, there is provided a method for sensing images through photoelectric conversion by using an image sensor, the method including a) sensing an image using a number of pixels of a photoelectric conversion semiconductor device mounted on a stationary scanner unit; b) storing data of the image sensed by the photoelectric conversion semiconductor device; c) moving the scanner unit to a location on a plane; d) sensing a different image by the pixels of the photoelectric conversion semiconductor device at the location; e) storing data of the different image; f) moving the scanner unit and repeating steps c) to e); and g) comparing the data stored in accordance with a location of the photoelectric conversion semiconductor device and analyzing the data so as to create data of a resulting image having an improved resolution.

The scanner unit may be made to travel a distance shorter than a distance between adjacent pixels.

The scanner unit may be moved in a horizontal or vertical direction on the plane. In addition, the scanner unit may be moved on the plane in a direction different from a direction of a previous movement.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENTS

Figure 1:
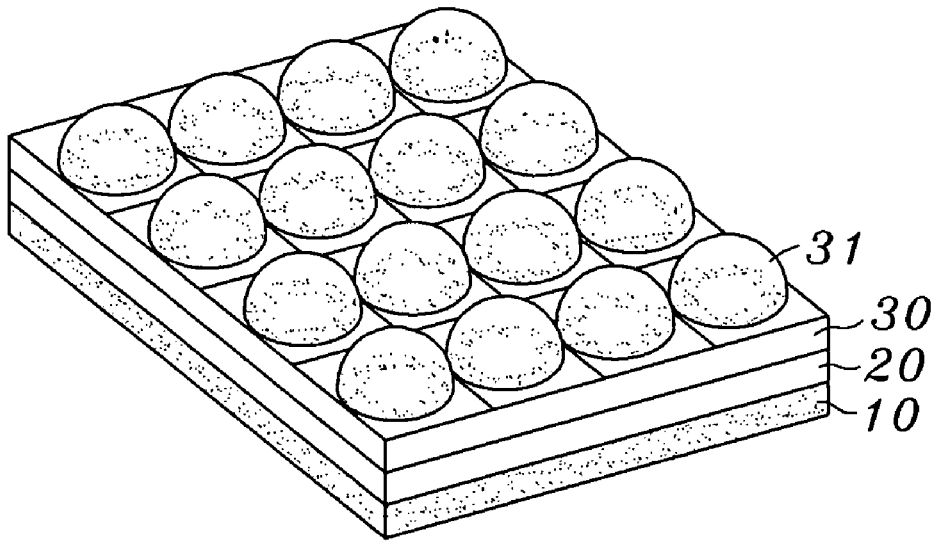
FIG. 1 is a perspective view showing a conventional image sensor adapted to sense images through photoelectric conversion.
Figure 2:
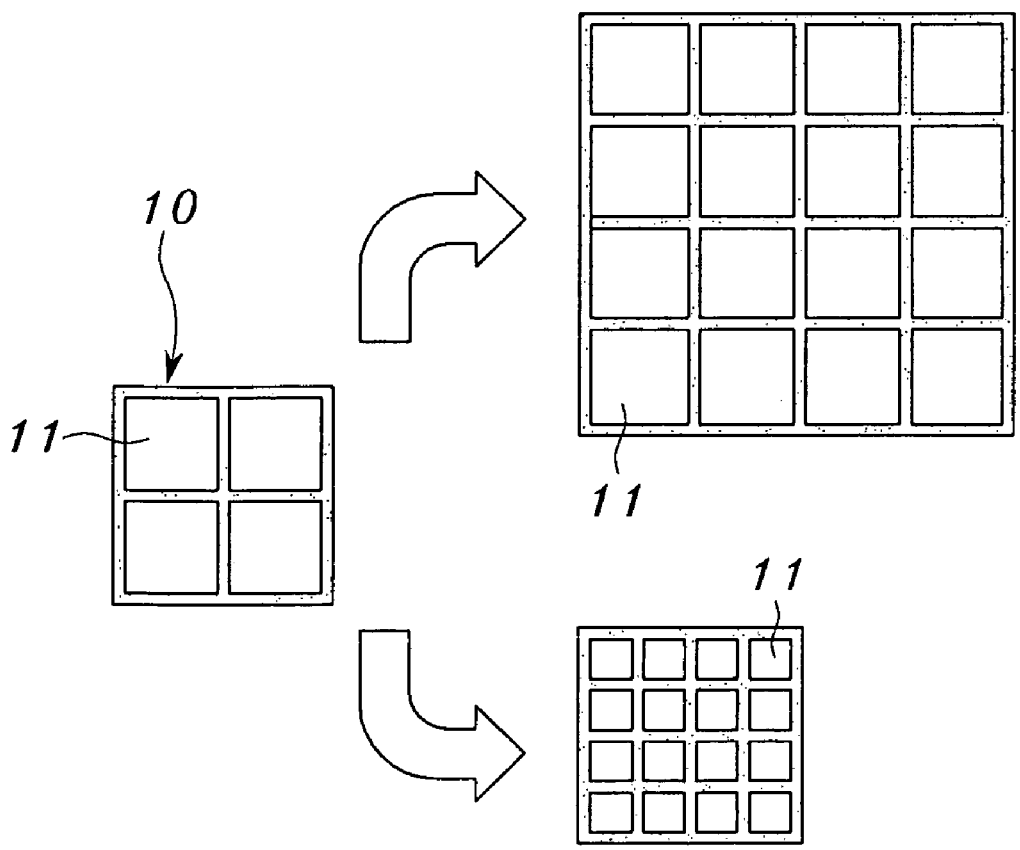
FIG. 2 shows a method for increasing the number of pixels of a photoelectric conversion semiconductor device of a conventional image sensor, in order to improve the resolution.

Hereinafter, exemplary embodiments of the present invention will be described with reference to the accompanying drawings. In the following description and drawings, the same reference numerals are used to designate the same or similar components, and so repetition of the description on the same or similar components will be omitted.

Figure 3:
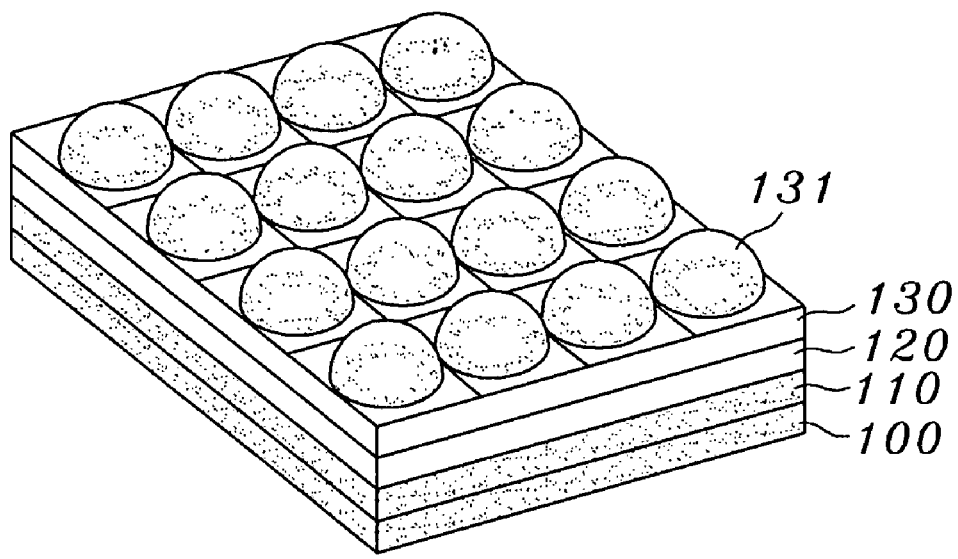
FIG. 3 is a perspective view showing an image sensor having an improved resolution according to an exemplary embodiment of the present invention.
Figure 4:
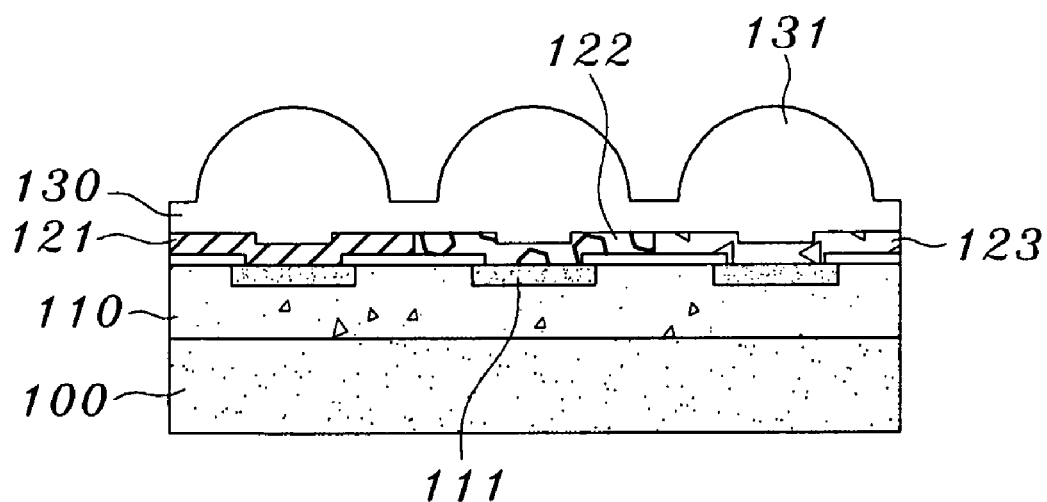
FIG. 4 is a partial sectional view of the image sensor shown in FIG. 3.

FIG. 3 is a perspective view showing an image sensor having an improved resolution according to an exemplary embodiment of the present invention, and FIG. 4 is a partial sectional view of the image sensor shown in FIG. 3.

Referring to FIGS. 3 and 4, an image sensor having an improved resolution according to an exemplary embodiment of the present invention includes a scanner unit 100, a photoelectric conversion semiconductor device 110, and a color filter array 120. A micro-lens array 130 may be formed on top of the color filter array 120.

The scanner unit 100 is adapted to move on a plane and acts as a support on which the photoelectric conversion semiconductor device 110 is fixedly mounted. The scanner unit 110 may be connected to an external control unit so that it can travel a predetermined distance in the horizontal or vertical direction in a software mode.

The scanner unit 100 may be adapted to move with such a precision that it can travel a distance shorter than the distance between adjacent pixels of the photoelectric conversion semiconductor device 110. This guarantees that, based on the movement of the scanner unit 100, the photoelectric conversion semiconductor device 110 can travel a distance shorter than the distance between adjacent pixels in the horizontal or vertical direction.

The photoelectric conversion semiconductor device 110 is fixedly mounted on top of the scanner unit 100 and has a number of pixels arranged on the front surface so as to constitute a light receiving unit 111. Particularly, each pixel generates a signal charge in proportion to the intensity of light incident on the pixel. As the photoelectric conversion semiconductor device 110, a MOS-type or CCD-type solid-state image sensing device may be used.

The color filter array 120 is adapted to create color digital images and has an array of filters (e.g., red, green, and blue filters 121, 122, and 123 respectively), which correspond to the pixels of the photoelectric conversion semiconductor device 110 on a one-to-one basis. The color filter array 120 is formed on top of the light receiving unit of the photoelectric conversion semiconductor device 110 through a lithography process, for example.

The micro-lens array 130 consists of a number of lenses, e.g. hemispherical micro-lenses 131, which are two-dimensionally arranged on top of the color filter array 120. The lenses are aligned with respective pixels of the photoelectric conversion semiconductor device 110 (as in the case of the filters of the color filter array 120) so as to increase the amount of light incident on the light receiving unit.

The image sensor having an improved resolution according to an exemplary embodiment of the present invention is operated as follows: as the scanner unit 100 moves, the photoelectric conversion semiconductor device 110 fixedly mounted on top of the scanner unit 100 moves accordingly. Then, image data obtained by the photoelectric conversion semiconductor device 110 at a location and that obtained at another location are combined and modified through image processing, so that the resolution of images is improved. The fact that, based on the movement of the scanner unit 110, the photoelectric conversion semiconductor device 110 can travel a distance shorter than the distance between adjacent pixels makes it possible to sense additional image data at locations, which are out of reach of conventional image sensors.

An image sensing method using an image sensor having an improved resolution so that the resolution of sensed images is improved accordingly will now be described.

Figure 5:
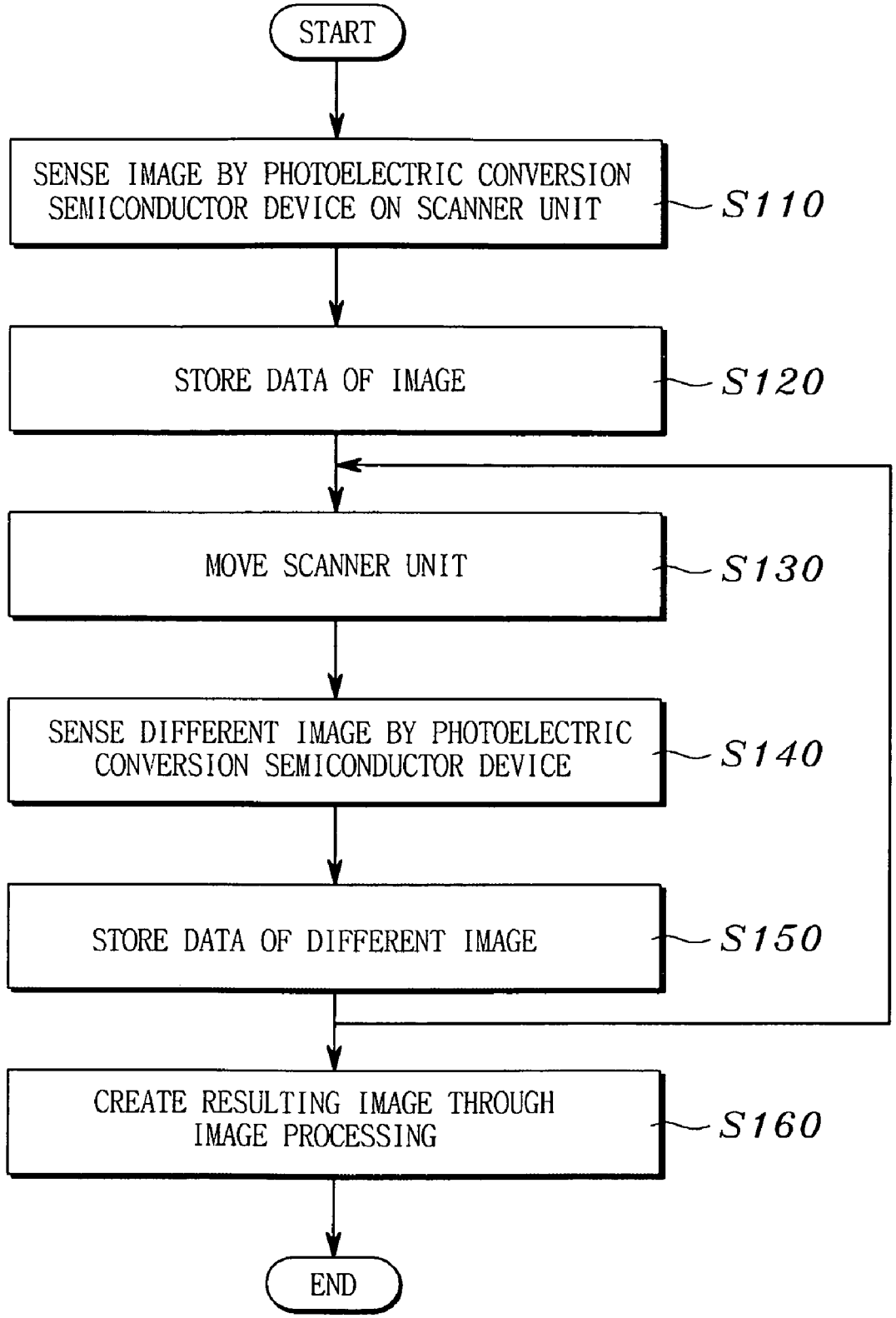
FIG. 5 is a flowchart showing an image sensing method using an image sensor according to an exemplary embodiment of the present invention.

FIG. 5 is a flowchart showing an image sensing method using an image sensor according to an exemplary embodiment of the present invention.

Referring to FIG. 5, an image sensing method using an image sensor adapted to sense images through photoelectric conversion begins with sensing a first image by a number of pixels of a photoelectric conversion semiconductor device mounted on a scanner unit, which remains stationary (S110). Data of the first image is obtained by converting the intensity of light incident on a light receiving unit of the photoelectric conversion semiconductor device (size of optical signals) into electric signals, together with color data from a color filter array.

The data of the first image is stored in a data storage unit of an image sensing device (e.g., digital camera) by means of an external control unit (S120).

The scanner unit, on which the photoelectric conversion semiconductor device is mounted, is moved on the same plane (S130). The scanner unit may be adapted to travel a distance shorter than the distance between adjacent pixels in the horizontal or vertical direction on the plane.

When the scanner unit has traveled a distance shorter than the distance between pixels of the photoelectric conversion semiconductor device, the centers of the pixels are positioned between the previous locations (i.e., locations before movement) of the centers of the pixels. The distance between pixels may correspond to an integer multiple of the distance traveled by the scanner unit. In other words, the distance traveled by the scanner unit may correspond to ½ or ⅓ the distance between pixels.

For example, when the scanner unit has traveled a distance corresponding to ½ the distance between pixels of the photoelectric conversion semiconductor device in the horizontal or vertical direction, the pixels are positioned halfway between the previous locations of the pixels.

After the movement of the scanner unit, a second image is sensed by a number of pixels of the photoelectric conversion semiconductor device (S140). The second image is stored in the data storage unit, which has already stored the first image obtained before the movement (S150).

In summary, the data of the first image has been obtained at the center of the pixels before movement of the scanner unit, and the data of the second image has been obtained halfway between the centers of the pixels after movement of the scanner unit. Combination of the first and second data advantageously creates virtual pixels halfway between the previous locations of the pixels of the photoelectric conversion semiconductor device.

The data of the first and second images stored in the data storage unit are compared with each other and analyzed through image processing, and are coupled to each other so as to obtain data of a resulting image having an improved resolution (S160).

In order to further improve the resolution of the resulting image, the scanner may be moved again on the plane after the data of the second image is stored in the data storage unit. Then, a third image is sensed by a number of pixels of the photoelectric conversion semiconductor device and stored in the data storage unit.

In this case, the scanner unit may be moved in a direction different from the previous one. For example, if the scanner unit has previously traveled in the horizontal direction, the scanner unit is moved in the vertical direction this time, or vice versa.

The scanner unit may be adapted to travel a distance shorter than ½ the distance between pixels (e.g., ⅓ or ¼) in the horizontal or vertical direction, in order to further improve the resolution. In the former case (⅓), the scanner unit can travel to a location corresponding to ⅓ the distance between pixels and another location corresponding to ⅔ the distance (or ¼, 2/4, and ¾ in the latter case of ¼) so that data of an image at each location is sensed and stored. The scanner unit is moved to every possible location on the plane in the horizontal or vertical direction, regardless of the order of movement, so that the data of an image is sensed at each location by the photoelectric conversion semiconductor device and stored continuously.

The data of image obtained at every location of the scanner unit is compared with each other through image processing and coupled to each other so as to obtain data of a resulting image having a far better resolution.

The merit of the image sensing method using an image sensor having an improved resolution according to an exemplary embodiment of the present invention will now be described.

Figure 6:
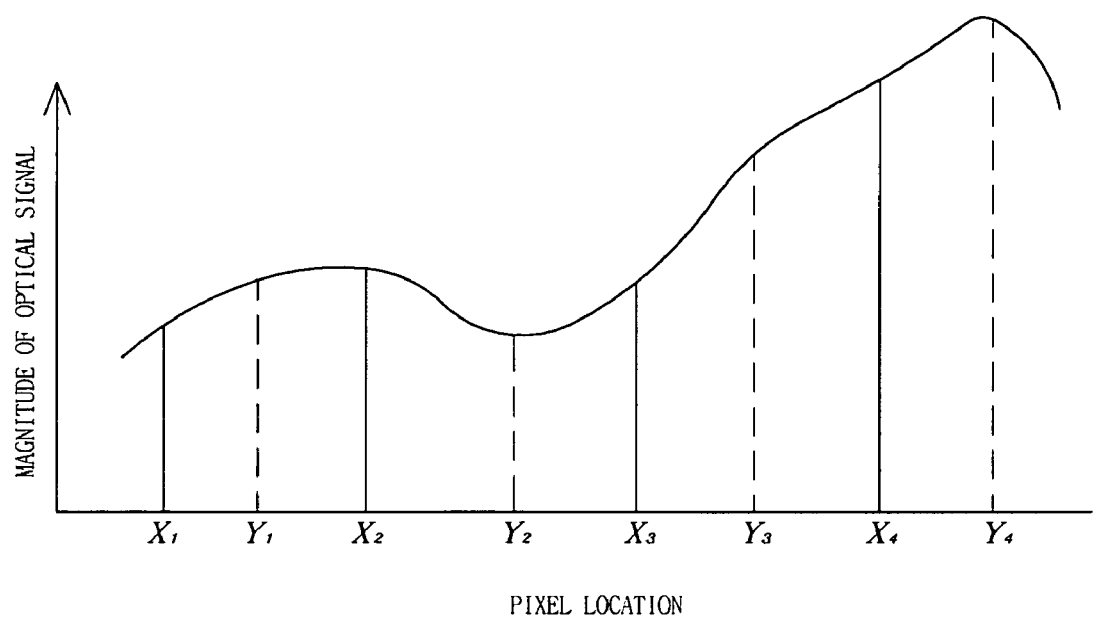
FIG. 6 is a graph showing the merit of an image sensing method using an image sensor according to an exemplary embodiment of the present invention.

FIG. 6 is a graph showing the merit of an image sensing method using an image sensor according to an exemplary embodiment of the present invention.

In the graph of FIG. 6, the axis of ordinate indicates the relative magnitude of optical signals sensed by respective pixels of a photoelectric conversion semiconductor device, and the axis of abscissa indicates the location of respective pixels. For example, X1, X2, X3, and X4 refer to the locations of pixels before movement of the scanner unit, respectively, and Y1, Y2, Y3, and Y4 refer to the locations of pixels after movement, respectively.

It is clear from FIG. 6 that, after a movement of the scanner unit, it is possible to sense a very small change in the size of optical signals, which could not have been sensed without the movement. By combining these image data through image processing, a resulting image having a better resolution is obtained.

As mentioned above, exemplary embodiments of the image sensor having an improved resolution according to the present invention is advantageous in that, by sensing images while moving the photoelectric conversion semiconductor device fixed to the scanner unit, it is possible to sense data of images, which cannot normally be sensed according to the related art, by using a conventional photoelectric conversion semiconductor device without modification. As a result, images having a better resolution are obtained without incurring further cost or degrading the performance.

In addition, the inventive image sensing method uses an image sensor, which is provided with a movable scanner unit, so that image data can be additionally sensed at various locations between pixels. As a result, the resolution of images sensed by the image sensor is improved efficiently.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An image sensor for sensing images through photoelectric conversion with an improved resolution, the image sensor comprising:

a scanner unit provided with a support which moves on a plane over a distance shorter than a distance between pixels in a horizontal or vertical direction, and configured to function as a support on which a photoelectric conversion semiconductor device can be fixedly mounted;

a photoelectric conversion semiconductor device fixedly mounted on the scanner unit and having a number of pixels being arranged on a front surface; and an array of color filters arranged on the photoelectric conversion semiconductor device so as to correspond to the pixels, wherein data of a resulting image with an improved resolution is created by performing comparison, analysis and combination on data of an image, obtained by the photoelectric conversion semiconductor device, using image processing.

2. The image sensor as claimed in claim 1, further comprising an array of micro-lenses disposed on top of the array of color filters while corresponding to the pixels so that light is collected.

3. A method for sensing images through photoelectric conversion by using an image sensor, the method comprising:

sensing an image by a number of pixels of a photoelectric conversion semiconductor device mounted on a stationary scanner unit;

storing data of the image sensed by the photoelectric conversion semiconductor device;

moving the scanner unit on a plane over a distance shorter than a distance between the pixels;

sensing a different image by the pixels of the photoelectric conversion semiconductor device at a location;

storing data of the different image; and creating data of a resulting image with an improved resolution by performing comparison, analysis and combination on data of the image and data of the different image using image processing, wherein the scanner unit is provided with a support which moves on a plane and functions as a support on which the photoelectric conversion semiconductor device can be fixedly mounted.

4. The method as claimed in claim 3, wherein the scanner unit is moved in a horizontal or vertical direction on the plane.

5. A method for sensing images through photoelectric conversion by using an image sensor, the method comprising:

a) sensing an image by a number of pixels of a photoelectric conversion semiconductor device mounted on a stationary scanner unit;

b) storing data of the image sensed by the photoelectric conversion semiconductor device;

c) moving the scanner unit on a plane over a distance shorter than a distance between the pixels in a horizontal or vertical direction;

d) sensing a different image by the pixels of the photoelectric conversion semiconductor device at a location;

e) storing data of the different image;

f) moving the scanner unit and repeating operations c) to e); and g) creating data of a resulting image with an improved resolution by performing comparison, analysis and combination on data of the image, stored in accordance with locations of the photoelectric conversion semiconductor device, using image processing, wherein the scanner unit is provided with a support which moves on a plane and functions as a support on which the photoelectric conversion semiconductor device can be fixedly mounted.

6. The method as claimed in claim 5, wherein the scanner unit is moved in a horizontal or vertical direction on the plane.

7. The method as claimed in claim 5, wherein the scanner unit is moved on the plane in a direction different from a direction of a previous movement.

8. The method as claimed in claim 6, wherein the scanner unit is moved on the plane in a direction different from a direction of a previous movement.

\* \* \* \* \*